(12) United States Patent
Handa et al.

(10) Patent No.: US 7,307,105 B2
(45) Date of Patent: *Dec. 11, 2007

(54) THERMOPLASTIC FOAMS MADE WITH METHYL FORMATE-BASED BLOWING AGENTS

(75) Inventors: Yash Paul Handa, Pittsford, NY (US); Gary A. Francis, Canandaigua, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/934,832

(22) Filed: Sep. 3, 2004

(65) Prior Publication Data

US 2006/0052464 A1   Mar. 9, 2006

(51) Int. Cl.
C08J 9/00      (2006.01)
C08J 9/14      (2006.01)

(52) U.S. Cl. .............................. 521/79; 521/97; 521/98; 521/142; 521/146

(58) Field of Classification Search ................. 521/79, 521/97, 98, 142, 146
See application file for complete search history.

(56) References Cited

U.S. PATENT DOCUMENTS

| | | | |
|---|---|---|---|
| 2,816,827 A | 12/1957 | Roth | |
| 2,861,898 A | 11/1958 | Platzer | |
| 2,911,382 A | 11/1959 | Barkhuff | |
| 2,983,962 A | 5/1961 | Merz | |
| 3,085,073 A | 4/1963 | Lintner | |
| 3,089,857 A | 5/1963 | Pottenger | |
| 3,379,799 A | 4/1968 | Goldman | |
| 3,577,360 A | 5/1971 | Immel | |
| 3,759,641 A | 9/1973 | Immel | |
| 3,855,377 A | 12/1974 | Uebelhart | |
| 3,864,444 A | 2/1975 | Johnson | |
| 3,900,433 A | 8/1975 | Taub et al. | 260/2.5 |
| 3,914,191 A * | 10/1975 | Scott | 521/97 |
| 3,929,686 A * | 12/1975 | Stevenson | 521/89 |
| 3,961,000 A * | 6/1976 | Ropiequet | 264/45.5 |
| 3,962,154 A | 6/1976 | Egli | |
| 4,009,976 A | 3/1977 | Johnson | |
| 4,033,910 A | 7/1977 | Papa | 260/2.5 |
| 4,042,658 A | 8/1977 | Collins | |
| 4,098,941 A | 7/1978 | Johnson | 428/218 |
| 4,104,440 A | 8/1978 | Collins | |
| 4,272,469 A | 6/1981 | Smith | |
| 4,323,528 A | 4/1982 | Collins | 264/53 |
| 4,557,881 A | 12/1985 | Rabotski | 264/40.4 |
| 4,695,595 A | 9/1987 | Blount | 521/99 |
| 4,769,396 A | 9/1988 | Blount | 521/114 |
| 4,960,804 A | 10/1990 | Doerge | 521/130 |
| 4,997,858 A | 3/1991 | Jourquin et al. | 521/118 |
| 5,064,872 A | 11/1991 | Monstrey et al. | 521/131 |
| 5,149,473 A | 9/1992 | LeDuc | 264/51 |
| 5,166,182 A | 11/1992 | Blanpied | 521/50 |
| 5,227,408 A | 7/1993 | Hanna et al. | 521/130 |
| 5,242,494 A | 9/1993 | Callaghan et al. | 106/603 |
| 5,283,003 A | 2/1994 | Chen | 252/350 |
| 5,336,696 A | 8/1994 | Ashida | 521/113 |
| 5,439,947 A | 8/1995 | Bartlett et al. | 521/131 |
| 5,478,494 A | 12/1995 | Lee et al. | 525/182.25 |
| 5,532,284 A | 7/1996 | Bartlett et al. | 521/134 |
| 5,563,180 A | 10/1996 | Skowronski et al. | 521/125 |
| 5,786,401 A | 7/1998 | Inagaki et al. | 521/128 |
| 5,912,279 A | 6/1999 | Hammel et al. | 521/146 |
| 5,922,348 A | 7/1999 | Wegner | 424/443 |
| 5,965,231 A | 10/1999 | Rotermund et al. | 428/69 |
| 6,136,875 A | 10/2000 | Wu et al. | 521/97 |
| 6,315,932 B1 | 11/2001 | Fujiwara et al. | 264/53 |
| 6,355,341 B1 | 3/2002 | Chaudhary et al. | 428/314.8 |
| 6,355,701 B1 | 3/2002 | Soukup et al. | 521/117 |
| 6,476,080 B2 | 11/2002 | Duffy et al. | 516/12 |
| 6,526,764 B1 | 3/2003 | Singh et al. | 62/84 |
| 6,569,912 B1 | 5/2003 | Oohara et al. | 521/79 |
| 6,599,946 B2 | 7/2003 | Duffy et al. | 516/12 |
| 6,696,504 B1 | 2/2004 | Hayashi et al. | 521/79 |

(Continued)

FOREIGN PATENT DOCUMENTS

WO    WO 91/13966 A1    9/1991

(Continued)

OTHER PUBLICATIONS

Cellular Materials, Encyclopedia of Polymer Science and Technology, J. Wiley and Sons, Article online, copyright 1999-2005.*

Primary Examiner—Irina S Zemel
(74) Attorney, Agent, or Firm—Baker Botts L.L.P.

(57) ABSTRACT

A blowing agent blend for making thermoplastic polymer foams comprises methyl formate. The blowing agent blend can further comprise at least one co-blowing agent. The co-blowing agent is either a physical co-blowing agent (e.g. an inorganic agent, a hydrocarbon, a halogenated hydrocarbon, a hydrocarbon with polar, functional group(s), water or any combination thereof), or a chemical co-blowing agent, or combinations thereof. The thermoplastic polymer foam can be an alkenyl aromatic polymer foam, e.g. a polystyrene foam. The blowing agent blend can comprise 100 mol % methyl formate, or it can comprise any combination of methyl formate and one or more co-blowing agents. The methyl formate-based blowing agent blends produce stable foams. A process for the preparation of such foams is also provided.

14 Claims, 1 Drawing Sheet

U.S. PATENT DOCUMENTS

| | | |
|---|---|---|
| 6,753,357 B2 | 6/2004 | Kalinowski et al. |
| 6,762,212 B2 | 7/2004 | Oohara et al. ............... 521/146 |
| 6,841,581 B2 | 1/2005 | Hayashi et al. ............... 521/79 |
| 2002/0198273 A1 | 12/2002 | Nyberg et al. ................ 521/98 |
| 2003/0078312 A1 | 4/2003 | Hibino et al. ................ 521/155 |
| 2003/0114549 A1 | 6/2003 | Kalinowski et al. .......... 521/99 |
| 2004/0006149 A1 | 1/2004 | Handa et al. ................. 521/79 |
| 2004/0024077 A1 | 2/2004 | Braun et al. ................. 521/155 |
| 2004/0132844 A1 | 7/2004 | Francis et al. ................ 521/79 |
| 2005/0131094 A1 | 6/2005 | Kalinowski et al. ........ 521/155 |

FOREIGN PATENT DOCUMENTS

WO  WO 2004/005382 A1  1/2004

\* cited by examiner

THERMOPLASTIC FOAMS MADE WITH METHYL FORMATE-BASED BLOWING AGENTS

FIELD OF INVENTION

The present invention relates generally to foams using blowing agent blends or mixtures, and processes of making the same. More particularly, the present invention relates to thermoplastic polymer foams using methyl formate-based blowing agent blends that produce stable foams, and processes of making the same.

BACKGROUND OF THE INVENTION

Polymer foams are commonly made by using a blowing agent with molten resin under pressure and, after thorough mixing, extruding the combination through an appropriate die into a lower pressure atmosphere.

In the past, physical blowing agents widely used for making foams were chlorofluorocarbons and hydrochlorofluorocarbons. Use of such blowing agents, however, will likely be banned because of their high ozone depletion potential (ODP). Some of these blowing agents can be replaced with hydrofluorocarbons (HFCs), which have zero ODP. However, HFCs are associated with high global warming potential (GWP).

Presently, physical blowing agents more commonly used for making thermoplastic polymer foams such as alkenyl aromatic polymer (e.g, polystyrene) or polyolefin polymer (e.g. polyethylene) foams, are butanes and isopentane. Hydrocarbons with three or more carbons atoms, however, are considered volatile organic compounds (VOCs) that lead to the formation of smog. Furthermore, some compounds currently used in blowing agent compositions are hazardous air pollutants (HAPs). The use of VOCs and/or HAPs for preparing polymeric foams is not preferred environmentally and imposes many limitations on the manufacturing process, thus complicating and significantly increasing the cost of manufacturing. Ethane is classified as a non-VOC because of its very low photochemical reactivity. The photochemical reactivity of methyl formate is even lower than that of ethane and, therefore, it can be considered to have negligible propensity to form smog. Furthermore, methyl formate is classified as a non-HAP, has zero ODP, and an almost zero GWP. Thus, a blend of methyl formate with some of the blowing agents in current use can help offset the harmful environmental impacts (ODP, GWP, HAP, VOC) associated with the blowing agents in current use. U.S. Pat. No. 6,753,357 describes the use of methyl formate to produce stable, rigid isocyanate/polyol based polyurethane foams. Such foams are thermoset foams made via a cross-linking and curing process, and the dimensional stability or instability imparted to the final foam product by the nature of the blowing agent is quite different than in the case of the melt processed thermoplastic polymer foams. Therefore, a need exists for blowing agents employing methyl formate as the sole or one of the components of the blowing agent blend to produce stable thermoplastic foams without compromising the product quality in terms of appearance, mechanical or compressive strength and insulation value, and that enable a cost-effective and versatile manufacturing process.

SUMMARY OF THE INVENTION

According to one embodiment of the present invention, a preferred blowing agent blend for making thermoplastic polymer foams comprises methyl formate. The blowing agent blend can further comprise at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, water or any combination thereof), a chemical co-blowing agent, or combinations thereof. In a preferred embodiment, the thermoplastic polymer foam is an alkenyl aromatic polymer foam. In a more preferred embodiment, the alkenyl aromatic polymer foam is a polystyrene foam. The blowing agent blend of the preferred embodiment comprises 100 mol % methyl formate, or it can comprise any combination of methyl formate and one or more co-blowing agents.

According to another embodiment, a thermoplastic polymer foam structure is prepared by a process comprising melting a thermoplastic polymer. An effective amount of a blowing agent blend is dissolved in the polymer melt. The blowing agent blend comprises methyl formate, and optionally at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, water or any combination thereof), a chemical co-blowing agent, or combinations thereof. An extrudate is formed and is expanded to produce the polymer foam structure. For example, and in accordance with a preferred embodiment of the present invention, the extrudate is initially transferred to an expansion zone and is permitted to expand in the expansion zone.

According to a process of the present invention, a thermoplastic polymer foam structure is produced by melting a thermoplastic polymer. An effective amount of a blowing agent blend is dissolved in the alkenyl aromatic polymer melt. The blowing agent blend comprises methyl formate, and optionally at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, water or any combination thereof), or a chemical co-blowing agent, or combinations thereof. An extrudate is formed and is expanded to produce the polymer foam structure. For example, and in accordance with a preferred embodiment of the present invention, the extrudate is initially transferred to an expansion zone and is permitted to expand in the expansion zone.

The polymer foam structure obtained by the process of the present invention is preferably a substantially closed-cell and/or a dimensionally-stable structure. In a preferred embodiment, the alkenyl aromatic foam structure comprises a polystyrene polymer.

Figure 1:
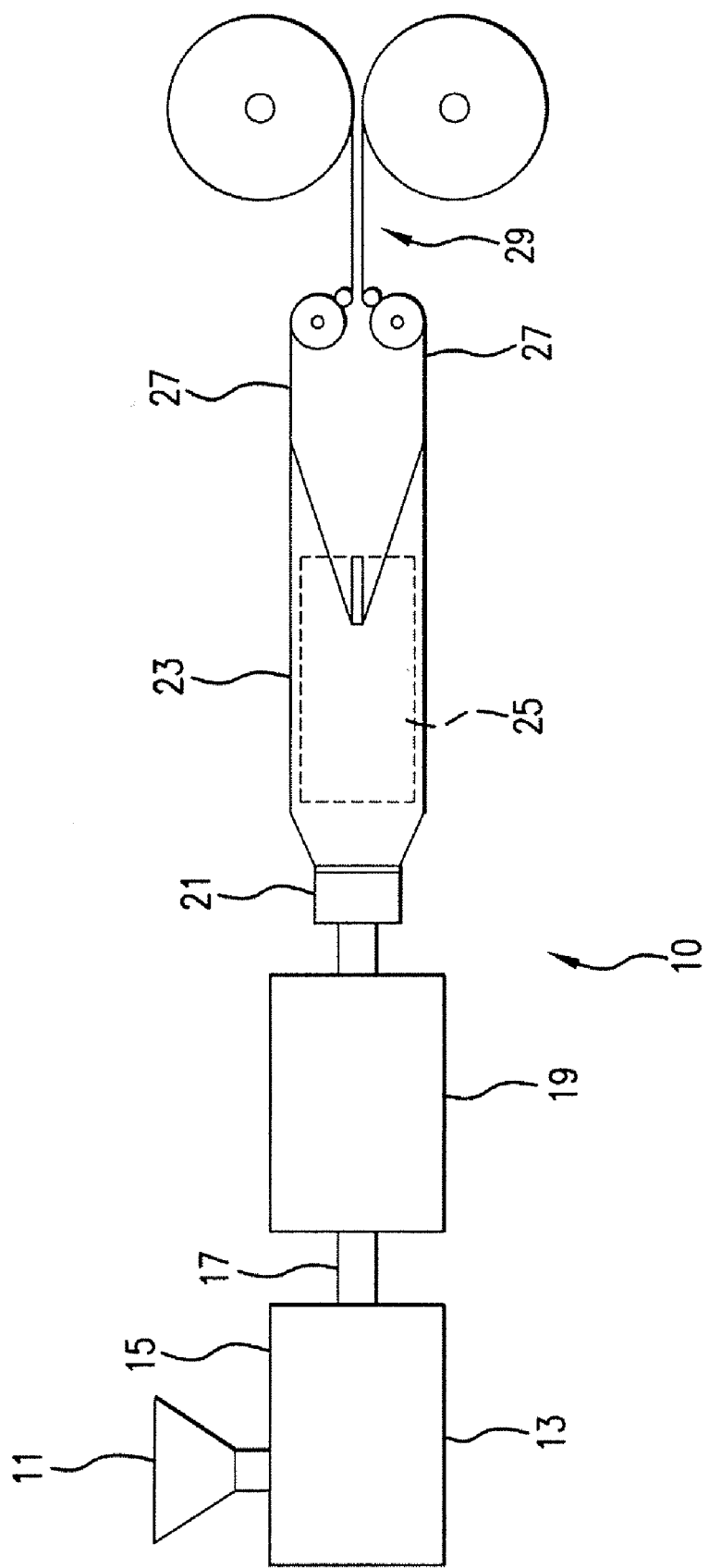
FIG. 1 is a schematic flow diagram of an overall sequence of operations involved in the manufacture of a foamed sheet with the blowing agent blends according to one embodiment of the present invention.

While the invention is susceptible to various modifications and alternative forms, specific embodiments thereof have been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

The effectiveness of a blowing agent depends on its solubility in the polymer melt and its ability to expand the polymer-blowing agent solution when such a solution is subjected to thermodynamic instability such as when the solution exits a die attached to an extruder (to give the extrudate). The expansion of the extrudate depends on the difference between the glass transition temperature of the thermoplastic polymer Tg and the boiling point of the blowing agent Tb. In general, the solubility of the blowing agent in the polymer melt depends on the difference between Tg and Tb (Tg–Tb); the smaller the difference the higher the solubility. Since volatility follows an inverse relationship with Tb, it also implies that at the same conditions of temperature and pressure, a higher volatility blowing agent will have lower solubility compared to a lower volatility blowing agent. It, therefore, suggests that by blending a lower volatility blowing agent with a higher volatility blowing agent, a foaming formulation with optimized solubility and expandability characteristics can be developed.

The foams and processes of the present invention employ a blowing agent blend or mixture to achieve a stable thermoplastic polymer foam. The preferred blowing agent blend used in the present invention is methyl formate-based. Methyl formate is not classified as a HAP and is the subject of a proposed rule by the U.S. Environmental Protection Agency (Federal Register, Volume 68, Number 170, Sep. 3, 2003) for its classification as a non-VOC because of its negligible photochemical reactivity and thus negligible contribution to smog formation. Specifically, eliminating HAPs and minimizing the propensity to smog formation from the manufacturing process and the foam resulting therefrom is not only safer and environmentally friendly, but also allows for a more cost effective and versatile process and product, thus avoiding many of the disadvantages of currently employed blowing agent compositions and processes.

Resins that can be foamed in accordance with the present invention include melt processable thermoplastic polymers such as alkenyl aromatic polymers, polyolefins, polycarbonates, polyacrylates, and others. The term thermoplastic polymer includes both amorphous and semi-crystalline polymers. Examples of amorphous thermoplastic polymers include but are not limited to polystyrene, polycarbonate, poly(methyl methacrylate) and poly(phenylene oxide). Examples of semi-crystalline thermoplastic polymers include but are not limited to polyethylene, polypropylene, syndiotactic-polystyrene, poly(ethylene terephthalate).

A preferred embodiment of the present invention relates to alkenyl aromatic polymers. The term "alkenyl aromatic polymer" as used herein includes polymers of aromatic hydrocarbon molecules that contain an aryl group joined to an olefinic group with only double bonds in the linear structure, such as styrene, or styrene homologs such as α-methylstyrene, o-, m- and p-methylstyrene, α-ethylstyrene, o-, m-, p-ethylstyrene, 2,4-dimethylstyrene, α-vinylxylene, vinyl toluene and the like. Alkenyl aromatic polymers also include homopolymers of styrene or styrene homologs (commonly referred to as polystyrene), copolymers of styrene, and rubber-toughened polystyrene (commonly referred to as high impact polystyrene, HIPS). With respect to a styrene copolymer, the comonomer generally can be any other ethylenically unsaturated material such as the conjugated 1,3-dienes, e.g., butadiene, isoprene, etc., alpha-beta-unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, blends of a styrene polymer with other polymers can be employed, e.g., blends of a styrene polymer with polyphenylene oxide. Preferably, the copolymers contain a predominant portion of styrene, for example greater than about 50 wt % styrene, and more preferably greater than 75% styrene.

The blowing agent blend comprises from about 1% to about 100% methyl formate. In one embodiment, the blowing agent blend comprises 100% methyl formate. In another embodiment, however, the blowing agent blend comprises less than 100% methyl formate, and further comprises at least one co-blowing agent. It is contemplated that more than one co-blowing agent can be employed in the blowing agent blend. Such co-blowing agent(s) can be physical, chemical or combinations thereof.

The co-blowing agent generally is fast expanding as compared to a pure methyl formate blowing agent. The co-blowing agent can be an organic compound or an inorganic compound. Some non-limiting examples of physical co-blowing agents include, but are not limited to, inorganic agents, organic agents (e.g. hydrocarbons, halogenated hydrocarbons, ethers, esters, acetals, alkanols, carbonates, amines and ketones), or any combination thereof.

Some suitable inorganic physical blowing agents include, but are not limited to, carbon dioxide, water, air, nitrogen, argon, xenon, sulfur hexafluoride, nitrous oxide, ammonia, silicon tetrafluoride, nitrogen trifluoride, boron trifluoride, and boron trichloride, or any combination thereof. In one currently preferred embodiment, the inorganic agent is an inorganic gas such as carbon dioxide, nitrogen, argon, air and the like. A currently preferred inorganic gas is carbon dioxide. In another currently preferred embodiment, the inorganic agent is water.

Some examples of organic physical co-blowing agents that can be used in the present invention include, but are not limited to, hydrocarbons, halogenated hydrocarbons, fluids with polar groups such as ethers, esters, acetals, carbonates, alkanols, amines and ketones, and combinations thereof. Examples of hydrocarbons include, but are not limited to, methane, ethane, propane, cyclopropane, normal- (n-) or iso-butane, cyclobutane, neopentane and isopentane, or any combination thereof. Halogenated hydrocarbons include, but are not limited to, methyl fluoride, difluoromethane (HFC-32), trifluoromethane (HFC-23), perfluoromethane, chlorodifluoromethane (HCFC-22), methylene chloride, ethyl chloride, ethyl fluoride, 1,2-difluoroethane (HFC-152), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), pentafluoroethane (HFC-125), perfluoroethane, 1,1-dichloro-1-fluoroethane (HCFC-141b), 1-chloro-1,1-difluoroethane (HCFC-142b), 1,1-dichloro-2,2,2-trifluoroethane (HCFC-123), and 1-chloro-1,2,2,2-tetrafluoroethane (HCFC-124), difluoropropane, 1,1,1-trifluoropropane, 1,1,1,3,3-pentafluoropropane (HFC-245fa), 1,1,1,2,3,3-hexafluoropropane (HFC-236ea), 1,1,1,2,3,3,3-heptafluoropropane (HFC-227ea), perfluoropropane, 2,2,4,4-pentafluorobutane (HFC-365mfc), perfluorobutane, perfluorocyclobutane, and vinyl fluoride, or any combination thereof. Fluids with polar groups include but are not limited to ethers such as dimethyl ether, vinyl methyl ether, methyl ethyl ether, dimethyl fluoroether, diethyl fluoroether, and perfluorotetrahydrofuran; amines such as dimethylamine, trimethylamine and ethylamine; ketones such as acetone and perfluoroacetone; esters such as ethyl formate and methyl acetate; acetals such as methylal; carbonates such as dimethyl carbonate; alkanols such as ethanol or any combination thereof.

The boiling point of methyl formate is 32° C. In another preferred embodiment of the present invention as applied to alkenyl aromatic polymers, methyl formate is mixed with one or more physical co-blowing agent(s) with boiling point less than 32° C.

Chemical co-blowing agents are compounds which undergo a chemical reaction, for example decomposition to produce an inorganic gas such as $CO_2$ or $N_2$. Non-limiting examples of suitable chemical co-blowing agents include azodicarbonamide, azodiisobutyro-nitrile, benzenesulfonhydrazide, 4,4-oxybenzene sulfonyl-semicarbazide, p-toluene sulfonyl semicarbazide, barium azodicarboxylate, N,N'-dimethyl-N,N'-dinitrosoterephthalamide, trihydrazino triazine, and other azo, N-nitroso, carbonate, and sulfonyl hydrazides. There are also various acid/bicarbonate mixtures that decompose into gases when heated. For example, mixtures of citric acid and sodium bicarbonate sold under the name HYDROCEROL® can be employed as chemical co-blowing agents.

The total amount of the blowing agent blend used depends on conditions such as extrusion-process conditions at mixing, the blowing agent blend being used, the composition of the extrudate, and the desired density and associated properties such as insulation value, weight to strength ratio, compressive strength, etc. of the foamed article. The extrudate is defined herein as including the blowing agent blend, polymer resin(s), and any additives. For a foam having a density of from about 1 to about 15 $lb/ft^3$, the extrudate typically comprises from about 18 to about 1 wt % of blowing agent.

The blowing agent blend used in the present invention comprises 100% methyl formate, or it can comprise less than about 99 mol % methyl formate. The blowing agent blend generally comprises from about 5 mol % to about 75 or 80 mol % methyl formate. The blowing agent blend more typically comprises from about 20 or 25 mol % to about 60 mol % methyl formate. More specifically, the blowing agent blend preferably comprises from about 20 or 25 mol % to about 50 mol % methyl formate.

If provided, the blowing agent blend generally comprises at least about 20 or 25 mol % of co-blowing agent(s). The blowing agent blend more typically comprises from about 80 or 75 mol % to about 40 mol % of co-blowing agent(s). More specifically, the blowing agent blend preferably comprises from about 80 or 75% to about 50 mol % of co-blowing agent(s). A nucleating agent or combination of such agents can be employed in the present invention for advantages such as its capability for regulating cell formation and morphology. A nucleating agent, or cell size control agent, can be any conventional or useful nucleating agent(s). The amount of nucleating agent used depends upon the desired cell size, the selected blowing agent blend, and the desired is foam density. The nucleating agent is generally added in amounts from about 0.02 to about 2.0 wt % of the polymer resin composition.

Some contemplated nucleating agents include inorganic materials (in small particulate form), such as clay, talc, silica, and diatomaceous earth. For example, talc can be used from about 0.25 to about 1.0 wt. % of the polymer composition. Other examples of nucleating agents include organic nucleating agents that decompose or react at the heating temperature within an extruder to evolve gases, such as carbon dioxide and/or nitrogen. One example is a combination of an alkali metal salt of a polycarboxylic acid with a carbonate or bicarbonate. Some examples of alkali metal salts of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate, respectively), and the disodium salt of ethanedioic acid (commonly referred to as sodium oxalate), or polycarboxylic acid such as 2-hydroxy-1,2,3-propanetricarboxylic acid. Some examples of a carbonate or a bicarbonate include, but are not limited to, sodium carbonate, sodium bicarbonate, potassium carbonate, potassium bicarbonate, and calcium carbonate.

It is contemplated that mixtures of different nucleating agents can be added in the present invention. Some more desirable nucleating agents include talc, crystalline silica, and a stoichiometric mixture of citric acid and sodium bicarbonate (the stoichiometric mixture having a 1 to 100 percent concentration where the carrier is a suitable polymer). Talc can be added in a carrier or in a powder form.

If desired, fillers, colorants, light and heat stabilizers, anti-oxidants, acid scavengers, stability control agents, flame retardants, processing aids, extrusion aids and foaming additives can be used in making the foam.

Any of the variety of suitable extrusion system and methods known in the art can be used in accordance with the present invention. One example of a suitable system and method includes, for example, a conventional two-extruder tandem system with each extruder having a single screw. Alternatively, a two-extruder tandem system in which the primary extruder is a twin screw, and the secondary extruder is a single screw can be used for extruding the foam article of the present invention. A single extruder with proper cooling can also be employed in the present invention.

According to one process of the present invention, thermoplastic polymer pellets (e.g., polystyrene) are admixed with a nucleating agent, such as talc. These materials are continuously fed into a hopper of an extruder. The feed mixture is conveyed forward by a screw within a barrel of the extruder as the mixture is mixed, compressed, heated, and converted to molten form. The conversion to molten form occurs prior to reaching an injection zone where the blowing agent is added. The blowing agent blend of the present invention can be injected into the polymer composition at a point where the polymer is in a melt state (i.e., beyond the feed zone). If the blowing agent blend comprises more than one component (i.e. methyl formate and one or more co-blowing agents), each of the components can be individually injected, either sequentially or simultaneously and in any order, into the polymer mixture. Alternatively, the components of the blowing agent blend can be pre-mixed and the mixture injected into the polymer composition.

After injecting the blowing agent blend, the mixture is continuously mixed at pressures to ensure a homogeneous solution of the resin and the blowing agent blend. The molten mixture is then conveyed into a cooling zone where additional mixing takes place. After cooling, the mixture is extruded into a holding zone maintained at a temperature and pressure that prevents or inhibits foaming of the mixture. The holding zone has (a) an outlet die having an orifice opening into a zone of lower pressure such as atmospheric pressure at which the mixture foams, (b) means for closing the orifice without disturbing the foamable mixture within the holding zone, and (c) opening means for allowing the foamable mixture to be ejected from the holding zone. An example of a holding zone is described in U.S. Pat. No. 4,323,528. Regardless of whether a holding zone is used, the mixture is then extruded through a die into a lower pressure zone, such as atmospheric pressure.

According to one embodiment as applied to alkenyl aromatic polymers such as polystyrene, a two-extruder tandem system 10 depicted in FIG. 1 can be used for extruding a foam article (e.g., a sheet) of the present invention. Polymer resin pellets are mixed with one or more additives (e.g., a nucleating agent and/or stability control agent) if desired to form a feed mixture which is fed continuously into a hopper 11 of a primary extruder 13. The feed mixture is conveyed forward by a helical screw within a barrel of the extruder as the feed mixture is mixed, compressed, heated and melted prior to reaching the blowing agent-injection zone. The blowing agent blend (comprising methyl formate optionally including at least one co-blowing agent) is added at point 15. Thus, the blowing agent blend of the present invention is injected into the polymer/additives mixture (feed mixture) at a point beyond the feed zone where the polymer is melted. If desired, the blowing agent blend can be injected at other locations, including into a secondary extruder.

Following injection of the blowing agent blend, the mixture is continuously mixed in the primary extruder 13. The exit pressure of the primary extruder 13 of the exemplary embodiment is generally in the range of from about 2000 to about 4000 psi. The temperature of the primary extruder 13 of the exemplary embodiment is generally in the range of from about 400 to about 475° F. The mixture is subsequently passed, at a high enough pressure that the blowing agent blend remains in solution, through a hollow adapter section 17 into a cooled secondary tandem extruder 19. The molten mixture is passed along the length of the cooled secondary extruder at low shear where cooling and additional mixing occur. The exit pressure of the secondary extruder 19 of the exemplary embodiment is generally in the range of from about 1000 to about 2500 psi. The temperature of the extrudate from the secondary extruder 19 of the exemplary embodiment is generally in the range of from about 250 to about 320° F. In general, the temperature of the primary extruder should be sufficient to melt the polymer and any additives, and to promote efficient mixing. The temperature and pressure in the secondary extruder should be sufficient to maintain the polymer and the blowing agent blend as a homogeneous solution. It is understood that the temperatures, pressures and other conditions described can vary depending on the properties of the thermoplastic polymer used in the process. The specific conditions to be used are apparent to a person of skill in the art.

The mixture is then expressed through an annular die 21 in the form of an elongated bubble or tube 23. The foamable polymer in FIG. 1 is expanded and drawn over a cylindrical surface of a cooling and sizing drum 25, and slit to form sheet stock 27. The sheet stock 27 is taken up on one or more winding reels 29. Alternatively, the foamable mixture is expressed through a die of a different configuration such as a flat die and allowed to expand in the form of a board or plank.

If the article produced is a sheet, the thickness of the sheet can be up to about 0.5 inch. If the article produced is a plank, the thickness is generally greater than 0.5 inch. The articles produced from the extruded tube are generally from about 0.020 to about 0.25 inch in thickness.

Depending upon the materials and process used, the resulting foamed article generally has a density from about 1 to about 15 lb/ft$^3$; more typically from about 2.0 to about 9.0 lb/ft$^3$. Furthermore, and in accordance with one preferred embodiment of the invention, the resultant foamed article has a substantially closed-cell structure and is defined herein as a foam having greater than about 85% closed cells and, more typically, greater than about 95% closed cells. Alternatively, and in accordance with another aspect of the invention, the resultant foamed article can be formed with 15% or more open cells, for examples 20%, 25%, 30% or more open cells. Furthermore, the resulting foam structure can be controlled to comprise at least about 20 cells per inch, for example at least 25, 30, 35, 40, 45 or 50 cells per inch.

The foam of the present invention can be used for insulation or as building materials, in various containers and packaging systems, or as protective or flexible packaging. Generally speaking, foam sheets are used in flexible as well as rigid packaging, while foam planks are used in protective packaging. In addition to foam sheets and planks, the present invention can take the form of other shapes such as rods, tubes or contoured members.

Other uses for the foams of the present invention, as well as suitable processes, apparatus, equipment, devices and systems for the preparation thereof are described in United States Patents and published Applications U.S. Pat. Nos. 6,136,875, 6,696,504, 2004/0132844 and 2004/0006149, the contents of each of which are incorporated by reference herein.

The resulting foam of the present invention is desirably "dimensionally stable". Dimensional stability as defined herein is when the density or gauge of the foam does not change by more than about 15%, preferably not more than 10%, and more preferably not more than 5% from the density or gauge of the foam after it has aged 3 to 7 days.

EXAMPLES

Various blowing agents were tested with the results shown below in Table 1. Specifically, several alkenyl aromatic polymer foams were made from comparative blowing agents and inventive blowing agent blends in accordance with the extrusion process generally described herein. It should be noted that in the various examples reported in Table 1, the hardware was the same and operated in exactly the same way; the only variable was the blowing agent blend. All of the inventive blowing agent blends included methyl formate; the comparative blowing agent(s) did not include methyl formate.

Each of the alkenyl aromatic polymer foams was made on a tandem extrusion line employing 2.5 inch and 3.5 inch single screw extruders and blowing agent was injected through a single port in the primary extruder. The polymer resin used was high heat general purpose polystyrene having a density of 1.05 g/cm$^3$ and a melt flow rate of 1.6 g/10 min at 200° C. under a load of 5 kg. In addition to the blowing agents and the polystyrene resin, talc was added in the amount of up to 2 wt % of the total foaming composition including all the blowing agent(s), polymer resin(s), and additives.

TABLE 1

| Sample Comp/Inv[2] | Ethane | Propane | Isobutane | n-Butane | Isopentane | CO2 | MF[3] | H2O | Talc wt %[1] | Density lb/ft³ | Open Cell % | Cell Size[4] micron | % Gauge Change[5] 1 hour | % Gauge Change[5] 7 days |
|---|---|---|---|---|---|---|---|---|---|---|---|---|---|---|
| Comp 1 | | | | | 5.20 | | | | 1.8 | 5.5 | 1.8 | 200 | 0.8 | 11.1 |
| Comp 2 | | | | | 3.96 | 0.77 | | | 1.0 | 4.7 | 1.0 | 196 | −7.9 | 12.9 |
| Inv 1 | | | | | | | 4.30 | | 1.9 | 8.1 | 2.2 | 187 | −0.3 | 5.6 |
| Inv 2 | | | | | | 0.76 | 3.32 | | 0.5 | 5.6 | 5.6 | 209 | −10.6 | −3.9 |
| Inv 3 | | | | | | 0.50 | 1.95 | 0.50 | 0.7 | 8.6 | 23.5 | 170 | −0.3 | 21.7 |
| Inv 4 | 0.56 | | | | | | 3.52 | | 0.7 | 5.8 | 2.2 | 234 | −1.1 | 4.7 |
| Inv 5 | 1.00 | | | | | | 2.40 | | 0.6 | 4.1 | 1.8 | 179 | −0.1 | 7.6 |
| Inv 6 | | 1.22 | | | | 0.55 | 1.97 | | 0.5 | 4.4 | 3.0 | 210 | −6.6 | 9.0 |
| Inv 7 | | 2.01 | | | | 0.37 | 1.21 | | 0.3 | 3.6 | 1.5 | 224 | 0.1 | 15.1 |
| Inv 8 | | 2.67 | | | | 0.34 | 0.34 | | 0.3 | 3.5 | 3.5 | 254 | 0.6 | 9.5 |
| Inv 9 | | | 3.57 | | | 0.35 | 0.27 | | 1.0 | 4.1 | 1.8 | 194 | 0.1 | 11.9 |
| Inv 10 | | | 3.04 | | | 0.35 | 0.74 | | 1.0 | 4.0 | 1.9 | 197 | −0.3 | 13.2 |
| Inv 11 | | | 2.65 | | | 0.31 | 1.17 | | 1.0 | 3.9 | 0.9 | 166 | 0.5 | 13.7 |
| Inv 12 | | | 2.03 | | | 0.37 | 1.82 | | 1.0 | 4.9 | 2.5 | 183 | −3.5 | 22.1 |
| Inv 13 | | | | 2.79 | | 0.78 | 1.00 | | 1.0 | 5.3 | 3.0 | 180 | −5.5 | 10.7 |
| Inv 14 | | | | | 2.63 | 0.35 | 1.20 | | 1.4 | 4.7 | 1.7 | 163 | −7.7 | 18.4 |

[1] wt % = (weight of a component)/(total weight of foaming composition including all the blowing agent(s), polymer resin(s), and additives)
[2] Comp—comparative example; inv—inventive example
[3] MF—methyl formate
[4] The number of cells per inch of the extruded foam ranged from 210 to 420. Cell size (expressed as diameter) was determined from scanning electron microscope image of the extruded sheet that has been aged at least 24 hours and then expanded in the z-direction (along the thickness direction) in a 240° F. oil bath for 2 minutes, while being mechanically constrained in the x and y directions; the number of cells per inch in these further expanded samples ranged from 110 to 210.
[5] % Gauge Change = 100 × (aged gauge − initial gauge)/initial gauge; initial gauge determined within 15 minutes of extrusion All of the above foams of Table 1 were dimensionally stable because after having undergone aging for 3 to 7 days no further significant change in the gauge was noticed. It is noted that all of the foams in Table 1, except for inventive example 2, showed post-extrusion growth. This unidirectional change is different from the conventionally used definition of dimensional stability whereby the foam can either shrink or expand with time. The compositions described herein provide stable foam structures produced by an environmentally friendly and cost-effective process. Furthermore, a variety of foams having suitable and desired characteristics can be formed in accordance with the present invention. For example, inventive composition 3 contains the highest percentage of open cells, and is thus advantageous since the flammable properties of the foam are reduced as the percentage of open cells increases due to rapid loss of the flammable component(s) of blowing agent blend. In another example, inventive compositions 2 to 5 include components with the least and negligible impact on air quality. Comparative example 2 is a typical formulation widely used in making polystyrene foam sheet or expanded beads. Other variants of this formulation, again in wide use, are where isopentane is replaced with isobutane or normal butane. Inventive examples 6 to 14 demonstrate how foam sheet (and, by extension, expanded beads) with similar characteristics can be made using formulation where the use of the hydrocarbon VOC blowing agent is much reduced. Furthermore, it should be noted that the total number of moles of the blowing agent in all the formulations in Table 1 is the same (about 0.07 moles per 100 g of total material processed). The attainment of foams with different densities thus simply reflects the effective volatility of the blowing agent blend. It will be obvious to one skilled in the art that foams with lower densities can be obtained by changing the blend composition and making it rich in the component(s) with higher volatility, and that the density can be further reduced by using more number of moles of the blowing agent blend. Each of the inventive compositions of Table 1 gives rise to a foam that is stable and easy to manufacture and handle.

While the present invention has been described with reference to one or more particular embodiments, those skilled in the art will recognize that many changes can be made thereto without departing from the spirit and scope of the present invention. Each of these embodiments and obvious variations thereof is contemplated as falling within the spirit and scope of the claimed invention, which is set forth in the following claims.

What is claimed is:

1. A process for making an alkenyl aromatic polymer foam sheet comprising:
    melting a thermoplastic alkenyl aromatic polymer;
    dissolving an effective amount of a blowing agent blend in the alkenyl aromatic polymer to define a mixture, the blowing agent blend consisting of methyl formate and carbon dioxide, and optionally water;
    forming an extrudate from the mixture; and
    expanding the extrudate to produce the alkenyl aromatic polymer foam sheet, wherein the blowing agent blend is the sole blowing agent in the polymer.

2. The process of claim 1, wherein the blowing agent blend consists of about 80 percent methyl formate and 20 percent carbon dioxide by weight.

3. The process of claim 1, wherein the blowing agent blend includes water in an amount of about 15 percent by weight of the blowing agent blend.

4. The process of claim 1, wherein the alkenyl aromatic polymer foam sheet is dimensionally stable.

5. The process of claim 4, wherein the alkenyl aromatic polymer foam sheet has an absolute percent gauge change less than about 15 percent after aging up to 7 days.

6. The process of claim 1, wherein the alkenyl aromatic polymer foam sheet has an average cell size of about 165 to about 255 micron.

7. The process of claim 1, wherein the extrudate contains from about 1 to about 18 percent by weight of the blowing agent.

8. The process of claim 1, wherein the alkenyl aromatic polymer is polystyrene.

9. The process of claim 1, further comprising mixing a nucleating agent with the alkenyl aromatic polymer prior to the extrudate forming step.

10. The process of claim 9, wherein the nucleating agent is selected from the group consisting of clay, talc, silica, diatomaceous earth, citric acid, sodium bicarbonate, carbon dioxide, nitrogen and mixtures thereof.

11. The process of claim 9, wherein the nucleating agent is a combination of an alkali metal salt of a polycarboxylic acid with a carbonate or bicarbonate.

12. The process of claim 1, wherein the alkenyl aromatic polymer foam sheet has a density from about 2 to about 9 lb/ft$^3$.

13. The process of claim 12, wherein the alkenyl aromatic polymer foam sheet has a density from about 6 to about 9 lb/ft$^3$.

14. The process of claim 1, wherein the alkenyl aromatic polymer foam sheet has a thickness up to about 0.5 inch.

\* \* \* \* \*